E. F. W. ALEXANDERSON.
INDUCTION GENERATOR.
APPLICATION FILED AUG. 3, 1907.
920,809.
Patented May 4, 1909.
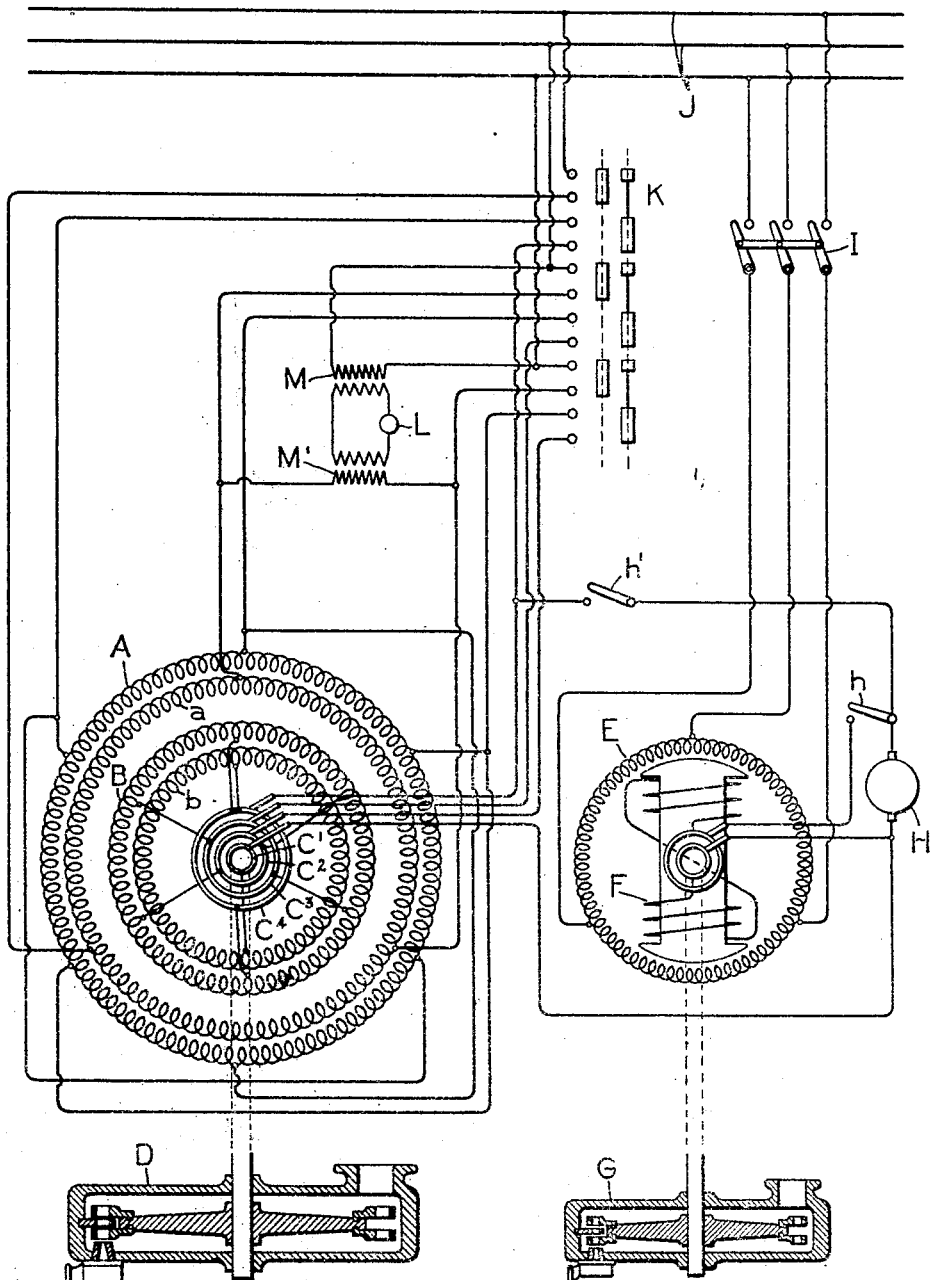
Witnesses:
George W. Tilden
J. Ellis Glen
Inventor:
Ernst F. W. Alexanderson,
by
Att'y.

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

INDUCTION-GENERATOR.

No. 920,809.      Specification of Letters Patent.      Patented May 4, 1909.

Application filed August 3, 1907. Serial No. 386,981.

*To all whom it may concern:*

Be it known that I, ERNST F. W. ALEXANDERSON, a citizen of the United States, residing at Schenectady, county of Schenectady, State of New York, have invented certain new and useful Improvements in Induction-Generators, of which the following is a specification.

My invention relates to induction generators designed to run at double synchronous speed. These machines have both members provided with distributing windings somewhat like the primary winding of an induction motor, and in operation both members are connected in parallel with the load-circuit. Such machines possess an advantage, as compared with ordinary synchronous alternators, when turbines, or other high-speed prime-movers, are used, and when low-frequency currents are desired, since for a given frequency and number of poles the induction generator operates at twice the speed of the synchronous generator, so that more efficient operation of the turbine is obtained.

The object of my invention is to provide a novel method of putting such machines into service, and a simple and effective arrangement for facilitating starting the machines in accordance with that method.

Induction machines require a synchronous machine for furnishing their exciting current and fixing the frequency. If the synchronous exciter is mounted on the same shaft with the induction generator, proper phase-relations between the two are fixed by the mechanical connection between them, and there is no difficulty in synchronizing the induction generator with other machines, or with the load-circuit, since it may be fully excited before throwing it into parallel with other machines. It is not always convenient, however, to mount the exciter on the same shaft with the induction generator, and then difficulties arise in connecting the machine to the bus-bars, since until it is connected to the bus-bars, it is not excited, and consequently when first thrown onto the bus-bars in parallel with other machines, it acts as a short-circuit on the bus-bars.

My invention consists in connecting the induction generator at starting as a synchronous machine with direct-current excitation and half its normal number of poles, synchronizing it when so connected with the bus-bars, and then connecting it to the bus-bars with its normal number of poles. If the starting and running connections are properly made with respect to each other, the induction generator acts like a properly synchronized synchronous machine when thrown onto the bur-bars. For facilitating this method of starting the generator I provide it, in addition to its main winding, with an auxiliary winding on each member of half the number of poles of the main windings. One of these windings at starting is excited by direct-current, and the other is synchronized with the bus-bars.

My invention will best be understood by reference to the accompanying drawing, which shows diagrammatically an induction generator arranged to be thrown into circuit in accordance with my invention.

In the drawing, A represents the main stator winding, and B the main rotor winding, each of which is shown as a three-phase four-pole winding. Auxiliary bi-polar windings *a* and *b* are placed on the stator and rotor, respectively, winding *a* being a three-phase winding, and the winding *b* adapted to be supplied with direct current. Collector-rings C¹ to C⁴ are provided for the rotor windings B and *b*, the main winding B being connected to collector-rings C², C³ and C⁴, and the auxiliary winding *b* to the collector-rings C¹ and C⁴.

D represents the prime mover for the generator, which I have indicated diagrammatically as a steam turbine.

E represents the armature winding of the synchronous machine, which serves as the exciter, and F is the field winding of this machine.

G represents a turbine driving the exciter.

H represents a source of direct-current excitation, which is arranged to be connected through the switch *h* to the field winding F of the synchronous exciter.

I represents a switch by means of which the armature winding E of the synchronous exciter is connected to the bus-bars J.

K represents a controlling switch for the induction generator having two positions, for starting and running respectively.

L represents a lamp or other suitable synchronous indicator supplied from a transformer M connected in parallel with one phase of the bus-bars, and the transformer M¹ connected in parallel with one phase of the auxiliary stator winding *a*.

The method of starting the induction machine is as follows: The synchronous exciter is started and switch $h$ is closed so as to excite the field. Switch I is closed so as to connect the armature of the exciter to the bus-bars. If other machines are connected to the bus-bars, the exciter is synchronized therewith, in the usual manner, before switch I is closed. The induction generator is then started, and switch $h^1$ is closed. This connects the direct-current exciter H to the collector-rings $C^1$ and $C^4$, thereby supplying direct-current excitation to the auxiliary rotor winding $b$. If the turbine D is running at proper speed, a voltage is induced at the terminals of auxiliary stator winding $a$ approximately in synchronism with the bus-bar voltage. By means of the synchronism indicator L, its voltage may be brought into phase with the bus-bar voltage, and the auxiliary winding $a$ is then connected across the bus-bars by moving switch K to its first position. The induction generator then operates as a bi-polar synchronous machine and is held in phase and in synchronism with the bus-bar voltage, so that if the terminal connections of the auxiliary winding $a$ and of the main winding A are properly arranged with respect to each other, the main windings may be thrown onto the bus-bars without producing any disturbing current-flow between the generator and the bus-bars. Consequently, if the switch K is thrown quickly from its starting to its running position, so as to cut out the auxiliary windings and to connect windings A and B in parallel to the bus-bars, the generator is thus thrown into circuit as an induction machine without producing a disturbing effect upon the bus-bar voltages.

I do not desire to limit myself to the particular construction and arrangement of parts here shown, but aim in the appended claims to cover all modifications which are within the scope of my invention.

What I claim as new, and desire to secure by Letters Patent of the United States, is,—

1. The method of putting into circuit an induction generator designed to run at double synchronous speed, which consists in connecting the generator as a synchronous machine with direct-current excitation and half its normal number of poles, synchronizing with the bus-bars, and then connecting it to the bus-bars as an induction machine with its normal number of poles.

2. The method of putting into circuit an induction generator designed to run at double synchronous speed and having main windings and auxiliary windings on both members, the auxiliary windings having half the number of poles of the main windings, which consists in supplying direct-current to one auxiliary winding and synchronizing the other with the bus-bars, and then cutting the auxiliary windings out of circuit and connecting both main windings in parallel to the bus-bars.

3. An induction generator designed to run at double synchronous speed having polyphase main windings on both members and an auxiliary winding on each member of half the number of poles of the main windings, one auxiliary winding having polyphase connections and the other being adapted to be supplied with direct current.

4. An induction generator designed to run at double synchronous speed having polyphase main windings on both members and an auxiliary winding on each member of half the number of poles of the main windings, a source of direct-current, bus-bars, means for connecting one auxiliary winding to said source, means for synchronizing the other auxiliary winding with the bus-bars, and means for connecting the main windings in parallel to the bus-bars.

5. An induction generator designed to run at double synchronous speed, bus-bars, means for connecting said generator for half its normal number of poles and for supplying direct-current to one member of the generator, means for synchronizing said generator when so connected, and means for connecting both members with their normal number of poles in parallel to the bus-bars.

In witness whereof, I have hereunto set my hand this 2nd day of August, 1907.

ERNST F. W. ALEXANDERSON.

Witnesses:
BENJAMIN B. HULL,
HELEN ORFORD.